Aug. 24, 1926.
A. G. F. KUROWSKI
1,597,321
TYPEWRITING MACHINE
Filed August 17, 1923
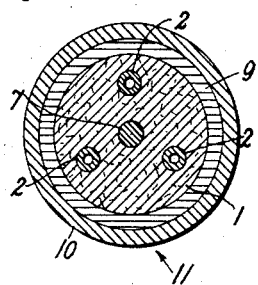
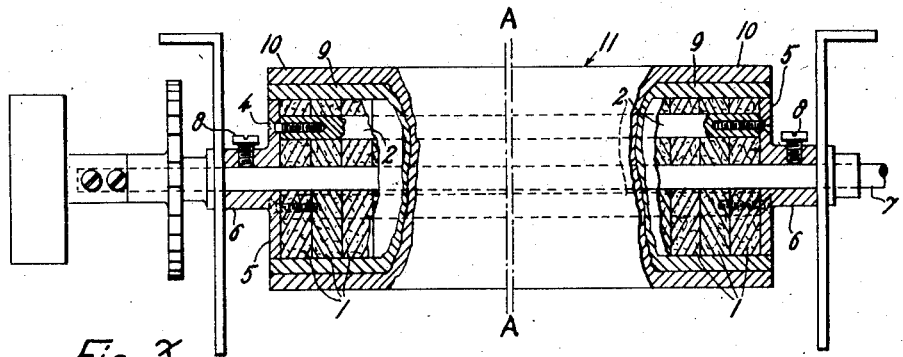
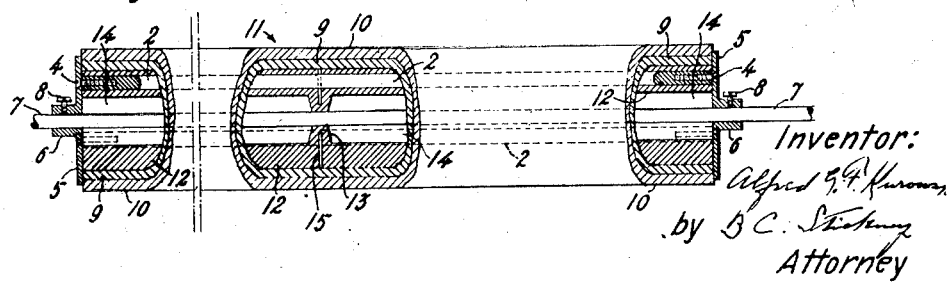
Inventor:
Alfred G. F. Kurowski
by B. C. Stickney
Attorney Patented Aug. 24, 1926.

1,597,321

UNITED STATES PATENT OFFICE.

ALFRED G. F. KUROWSKI, OF BROOKLYN, NEW YORK, ASSIGNOR TO UNDERWOOD TYPEWRITER COMPANY, OF NEW YORK, N. Y., A CORPORATION OF DELAWARE.

TYPEWRITING MACHINE.

Application filed August 17, 1923. Serial No. 657,870.

This invention relates to cylindrical platens for typewriting machines, and its object is to produce an improved platen of a kind which offers a surface to give clear-cut type-impressions, and in which the impact is deadened so as to lessen the noise incidental to the type striking the platen surface.

The platen is formed of a series of annular disks or washers placed side by side between two end plates. The disks may be bound together by tie-rods extending through the series, and the tie-rods may be fastened in spaced relation to the plates. The disks or washers may be assembled and secured together by the end plates and the tie-rods to form a cylindrical core and then turned down to the proper size to have a noiseless cylindrical cover pushed over the core.

The disks or washers may be formed of linoleum, "Neolin", or other tough, light and flexible material to assist in deadening the noise and absorbing the vibration due to the impact. The cylindrical cover is constructed of an inner part made of soft rubber, or the like, for absorbing and deadening the impact and an outer cover of hard rubber, or the like, forming the platen surface.

A modification of the platen structure within the scope of the invention may be formed that will be much lighter than that disclosed above by moulding the core of linoleum, or of like material, having embedded therein spaced aluminum tie-rods, as shown in Figure 3. The core may have a relatively large hollow center with a supporting rib extending inwardly, midway between the ends of the core, and through the center of which rib the platen-shaft passes for holding the latter against the tendency to vibrate. A metallic embedded re-enforcing piece is contained within the rib to establish a brace for the rods and the rib.

Other features and advantages will hereinafter appear.

In the accompanying drawings,

Figure 1 is a front elevation with parts broken away to show the interior section of the novel platen.

Figure 2 is a sectional elevation of the platen on the line A—A of Figure 1.

Figure 3 is a view similar to Figure 1, but showing a modified form of core.

The annular disks or washers 1 may be arranged side by side to form, in the aggregate, the inner cylindrical core of the platen. The disks or washers 1 may be made of linoleum, or any other material having similar physical properties, which has the necessary resilience and is at the same time light, tough and workable. The disks or washers 1 may be perforated at the center to allow the platen-axle 7 to snugly pass therethrough, and also may be perforated at preferably three equidistant points about the center, the perforations being placed in alignment with one another when the disks are assembled. Tie-rods 2 may extend through such openings in the disks or washers 1 about the center, so as to join them together in a tight pack.

The series of disks 1 forming the core may be provided with circular metallic end plates 5 to form abutments for the flat heads of screws 4. The bodies of the screws 4, passing through the end plates 5, are positioned so as to be threaded into the ends of the tie-rods 2, which firmly secure the core parts together into a compact, neat structure. The end plates 5 may be provided with hubs 6, each of which may be provided with a central opening in alignment with the similar openings in the disks 1 through which the platen-axle 7 may extend. The platen-axle 7 may be secured to the hubs in any suitable manner, as by means of set-screws 8 extending through the threaded openings in the hubs.

The disks, end plates and tie-rods may be assembled to form the core of the platen, and may be turned down on a lathe to the desired diameter to form a smooth surface, so that a cylindrical cover 11 can be pushed over it. The cylindrical cover 11 comprises an inner part 9 made of a flexible, resilient material, like soft rubber, and an outer shell 10 of firmer material, like hard rubber; the outer surface being ground to give the exact size and surface finish.

A modification of the platen within the scope of the invention may be formed which will be much lighter in weight than that disclosed above by casting the core 12, see Figure 3, of linoleum, or similar material. The core may have molded therein three spaced aluminum rods 2 arranged to be fastened to the plates 5 by the screws 4, as set forth above. The core may also have a hollow center 14 and an inwardly-extending supporting rib 13, midway between the ends of the core. A metal re-enforcing piece 15 may be embedded in the rib to brace the rods and the rib. The latter also supports the platen-shaft, which passes through the center of the core, against the tendency to vibrate.

Either completed platen when used will give as clear typewriting as does the ordinary platen, since it has exactly the same sort of a surface to support the work-piece while taking the type-impressions. The inner part 9, because of its flexibility and resiliency, will deaden the impact blow, so as to lessen the noise due to the type striking the platen surface. The inner core formed of the disks or washers 1 or molded reenforced core 12 will aid the inner part 9 to deaden the impact blow; since either resiliently interposes the platen cover and the axle, and, in addition, will in a large measure absorb the vibration caused by the impact, so that it will not be transmitted to the frame of the machine. Thus, a typewriting machine when used with either above-disclosed simply constructed platen will give clear-cut type-impressions, and the noise, incidental to the impact due to typing, will be greatly reduced.

Variations may be resorted to within the scope of the invention, and portions of the improvements may be used without others.

Having thus described my invention, I claim:

1. A platen comprising a substantially hard cylindrical outer shell forming a suitable surface to give clear-cut type-impressions, and a relatively resilient inner core to deaden the impact, to absorb the vibration and to lessen the noise incidental to the type striking the platen surface, said core comprising a series of disks of linoleum placed side by side tightly clamped together.

2. A revoluble platen for a typewriting machine including an axle on which the platen is mounted, including a substantially hard cylindrical outer shell having a surface on which to make clear-cut type-impressions, and a relatively resilient inner core of linoleum between said outer shell and the platen axle to deaden the impact, to absorb the vibration and to lessen the noise incidental to the type striking the platen surface.

ALFRED G. F. KUROWSKI.